United States Patent [19]

Skelton et al.

[11] Patent Number: 4,686,958

[45] Date of Patent: Aug. 18, 1987

[54] VERSATILE OUTDOOR COOKER

[76] Inventors: Maynard A. Skelton; Delores J. Skelton, both of 1624 W. Clara Dr., Petersburg, Va. 23803

[21] Appl. No.: 808,986

[22] Filed: Dec. 16, 1985

[51] Int. Cl.⁴ .................................................. F24D 1/00
[52] U.S. Cl. .............................. 126/369.2; 126/25 R; 126/41 R; 126/348; 99/339; 99/415
[58] Field of Search ................. 126/2, 9 R, 9 B, 25 R, 126/41 R, 345, 346, 348, 369, 369.2, 391, 276, 268; 99/355, 403, 444, 339

[56] References Cited

U.S. PATENT DOCUMENTS

| | | | |
|---|---|---|---|
| 943,152 | 12/1909 | Miracle | 126/346 |
| 2,109,212 | 2/1938 | Ehrgott | 99/416 X |
| 2,600,234 | 6/1952 | Foley | 126/268 X |
| 2,794,897 | 6/1957 | Giles | 99/403 X |
| 2,848,938 | 8/1958 | Klein | 99/403 X |
| 3,714,889 | 2/1973 | Mazzola et al. | 99/403 X |
| 3,722,498 | 3/1973 | Kimbrough | 126/9 R X |
| 3,771,510 | 11/1973 | Short | 126/41 R |
| 3,869,972 | 3/1975 | Chase | 99/403 X |
| 4,350,140 | 9/1982 | Hamilton | 126/276 |
| 4,397,299 | 8/1983 | Taylor et al. | 126/391 |

Primary Examiner—Margaret A. Focarino
Attorney, Agent, or Firm—Jim Zegeer

[57] ABSTRACT

An outdoor cooker has a rectangular metal cooking tank for holding a cooking liquid to be heated by a flame from a burner mounted beneath the cooking tank and includes a cooked food drain plate having an edge secured at a predetermined angle to the rear upper edge of the cooking tank so that cooking liquid from cooked food on the drain plate drains into the cooking tank with the cooked food drain plate being adapted to being heated by wasted heat from the burner. A domed cover minimizes heat loss from cooked food on the cooked food drain tray and prevents access to the cooked food by insects, grass, dirt, leaves, etc. The domed cover is preferably hingably connected to the edge of the drain plate remote from the upper edge of the cooking tank. A cooking tank cover, constituted by a flat metal plate having an area complimentary to the cross-sectional area of the open top of the cooking tank has a handle on the upper surface thereof and at least one depending flange for hooking the cooking tank cover from the front edge of the cooking tank while the cook is inspecting food being cooked. Several cooking tanks may be provided, each with a separate burner for each tank, and separate control for each burner so that different foods and different preparation styles may be used in each tank.

16 Claims, 6 Drawing Figures

U.S. Patent  Aug. 18, 1987  Sheet 2 of 2  4,686,958
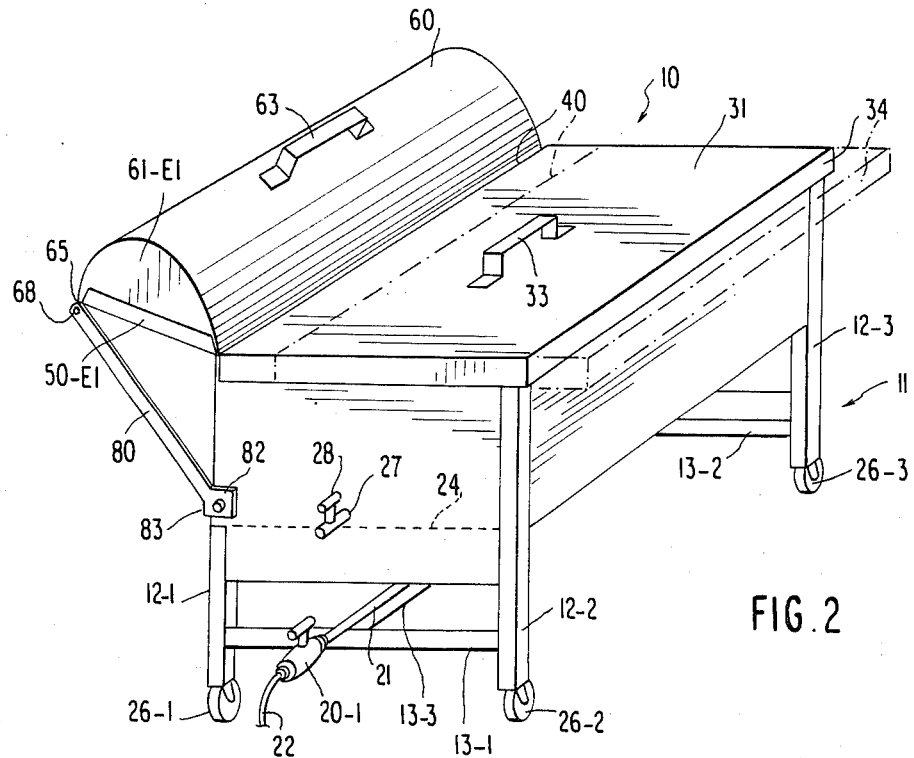
FIG. 2
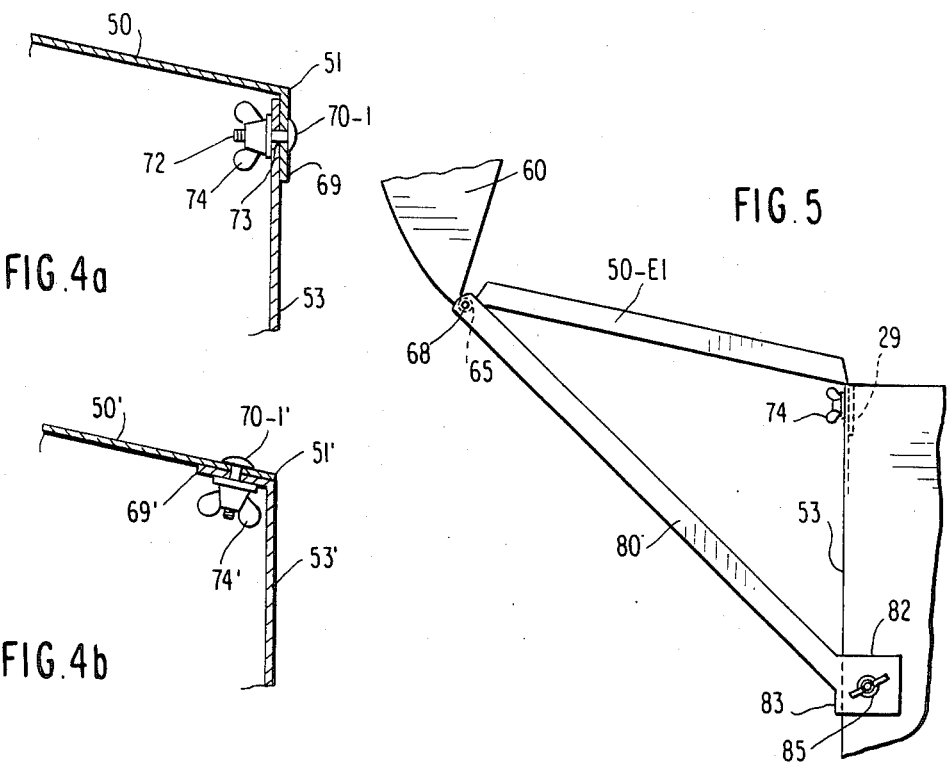
FIG. 4a
FIG. 4b
FIG. 5

VERSATILE OUTDOOR COOKER

BACKGROUND OF THE INVENTION

There have been a large number of cooker units disclosed in the art such as the portable deep fryer assembly of Kimbrough U.S. Pat. No. 3,722,498 which discloses a portable single well deep fryer which has a bottle gas burner and a detachable chimney to raise combustion fumes above the cooking level. There are large numbers of commercial units such as disclosed in Cooper U.S. Pat. No. 3,837,270 which illustrates a multi-compartment cooker wherein the lower portion can serve as an oven. Chase U.S. Pat. No. 3,869,972 discloses another commercial type multi-compartment fire having a built-in drain 15 and the commercial food fryer of Dey U.S. Pat. No. 3,626,840 has a plural food fryer and, similarly, the plural food fryer of Chase U.S. Pat. No. 3,869,972 is a commercial unit. The elaborate fryer of Moore et al U.S. Pat. No. 4,287,818 is essentially a heavy duty commercial unit not adapted as an outdoor cooker for home or non-commercial use. The device disclosed in Best U.S. Pat. No. 4,321,851 is not a fryer, steamer, barbecuer, etc., but is an infrared gas grill.

SUMMARY

The versatile multi-purpose outdoor cooker according to the present invention is a unique outdoor cooker which can fry, steam, barbecue, and broil chicken, ribs, fish, hamburgers, vegetables and even stews. It is easily cleaned and can be used to wash and rinse dishes. The multi-purpose cooker according to the present invention is divided so as to provide at least two cooking wells to allow the use of one or both sides individually as well as simultaneously to prepare various favorite foods. An attached drain rack or plate has the dual purpose of draining excess oils or other cooking liquids from foods back into the cooker and to keep foods warm and free from insects, grass, debris, leaves, etc. Each cooking well has a hollow bottom which allows the cook to make soups, stews and vegetables. The cooker can be used as a canner in which glass jars can be used.

The cooker is also great for washing and storing dishes and is thus made great for camping trips for large groups such as scout outings and the like. It can be used for frying fish or chicken for barbecuing ribs and chicken. Removable racks are provided for steaming crabs, lobster or shrimp and the racks are removable so that stews and soups can be prepared. The cooker is divided into two cooking wells so that frying or steaming of favorite foods can be done simultaneously and the attached drain tray keeps the food warm and drains excess oils or other cooking liquids back into the cooker. While conventional gas pots under the cooker are adjustable to control temperature, it will be appreciate that instead of gas, other fuels may be utilized, such as white gasoline. Drain plugs located on each side of the cooker allows the oil, cooking broths, water or other cooking liquid to be drained into a storage container until it is ready for use again. The cooker is designed for soap and water cleaning by using a sponge or garden hose. This multi-purpose cooker can be used at home or away from home and it has wheels for accessability on the patio, camping trips or the like or it can be taken on a boat to fry the great catch of the day. For the purpose of transporting the cooker, the drain tray is easily detached and reattached so that heat in the sidewalls of the cooking vessel are conductively conveyed to the drain tray so as to keep food warm. Moreover, the drain tray can be collapsed or detached so as to make the unit more compact for easier transportation and storage purposes.

The domed cover for the cooking tray is preferably hingably coupled to the cooking tray for ease of use and for retaining the heat and protecting the cooked food.

BRIEF DESCRIPTION OF THE DRAWINGS

The above and other objects, advantages and features of the invention will become more apparent when considered with the following specification and accompanying drawings wherein:

FIG. 2 is a similar isometric view showing the domed cover and the cooking well cover in a closed position, FIG. 3 is a side elevational view showing the domed cover closed and the cooking well cover in a stored or hooked position, FIGS. 4a and 4b show alternate constructions of coupling the drain tray to the cooking wells for coupling heat from the cooking well back wall to the drain tray, and FIG. 5 is a partial side view showing the release of the brace securement to the cooking vessel sidewall and the end thereof to the hinge pin for the domed drain tray cover.

DETAILED DESCRIPTION OF THE INVENTION

Figure 1:
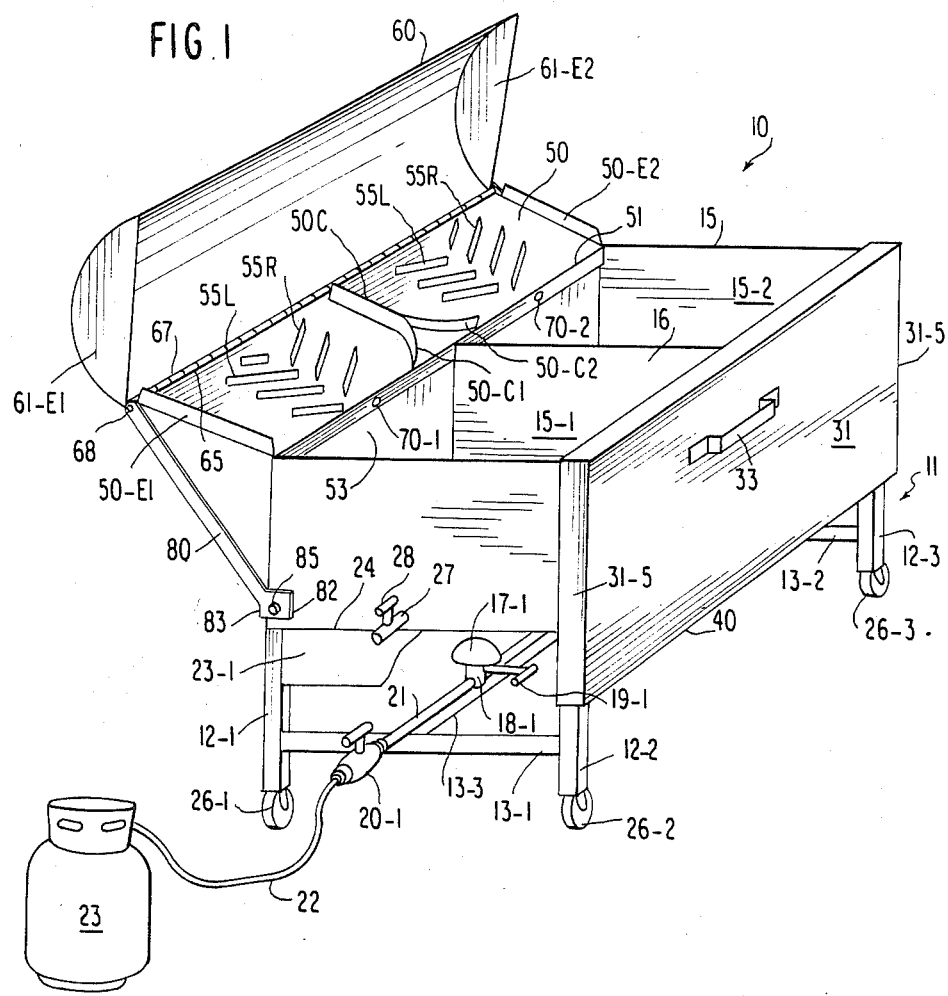
FIG. 1 is an isometric view of a cooker incorporating the invention showing the domed cover for the drain tray in an open position and the cover for the cooking wells open and stored position.

Referring now collectively to FIGS. 1–5 of the drawings, the multi-purpose cooker 10 of the present invention includes a lower support structure 11 constituted by four corner angle channel or post members 12-1, 12-2, 12-3 and 12-4 which are joined by cross braces 13-1 and 13-2 and a horizontal gas burner support member 13-3 which extends horizontally between horizontal brace members 13-1 and 13-2 and is secured at the lateral ends thereof by welding or by separate discrete fasteners. The ends of the cross braces 13-1 an 13-2 may be secured by welding or discrete fasteners to vertical angle posts 12-1, 12-2, 12-3 and 12-4. A rectangular cooking vessel 15 is supported on the upper end of vertical angle members 12-1, 12-2, 12-3 and 12-4 preferably by welding but may be detachably secured by bolts or other discrete fasteners not shown and the cooking vessel 15 may be divided by a divider 16 to provide two cooking vessels 15-1 and 15-2 each of which is provided with a separate controllable burner 17-1 and 17-2 (FIG. 3) each of which has its own individual control valve 18-1 and 18-2 separately controled by control knobs 19-1 and 19-2, respectively. A common shut-off valve 20-1 is coupled by gas conduit or passage 21 to the valves 18-1 and 18-2 for the individual burners and is coupled by a supply line 22 to a gas bottle 23. It will be appreciated that instead of bottled gas, a liquid fuel such as white gasoline may be utilized and supplied to burners 17 under pressure which are adapted to burn that kind of fuel. Depending side skirts 23-1 and 23-2 between the legs 12-1 and 12-2 respectively, and the legs 12-3 and 12-4 respectively, and the depending skirt 23-3 extends between legs 12-1 and 12-4 so that these skirts provide wind protection for the burners 17-1 and 17-2 from external wind conditions so that the user can position the unit to avoid the wind adversely affecting the burner operation. The user can easily have access to the different controls 19-1 and 19-2 from the front side of the cooker between the vertical angle members 12-2 and 12-3. In FIGS. 1 and 2, the dotted lines 24 indicate the lower edge of the cooking vessel 15.

In a preferred embodiment, the cooking vessel 15, drain tray 50 and covers 31 and 69 are made or fabricated of stainless steel with all connections between different plate members being welded by conventional stainless steel welding processes.

The frame 11 is provided with casters or roller wheels 26-1, 26-2, 26-3 and 26-4 respectively, so that the unit may be easily rolled or transported to any desired location. Each of the cooking tanks or vessels 15-1, 15-2 is provided with a drain 27 and a control valve 28 therefor. And as shown in FIG. 3, one or both tanks may be provided in the lower surface thereof with a removable food rack or grate 29. Lava rocks 30 or other high heat retention means may be supported and heated by one or both burners 17 so that for purposes of barbecuing, the meat or other product to be barbecued may be basted, with a barbecue and cooked supported by the racks over the lava rocks in the bottom of the tank or the material may be dipped in a barbecue sauce and layed upon the rack 29. As is known, the lava rocks retain and release heat for a long period of time so the burner can be turned down to conserve gas.

The drains 27 are used to remove cooking liquid or cleaning - wash water which may be maintained in a heated condition by the burners, one side of the tank serving as a soapy wash water with liquid and the like and the other serving as a rinse using heated rinse water.

THE COOKING TANK COVER

According to this invention, the cooking tank cover TC is constituted by a flat metal plate 31 having an area slightly larger than but complementary to the cross-sectional area of the cooking tank so as to close off the tops of the two cooking tanks 15-1 and 15-2. A flange 34 is secured in depending relation relative to the flat metal plate 31 so that the depending flange 34 can serve as a hook to hang the cooking tank cover TC from the upper front edge 35 of cooking tank 15 while the cook is inspecting or manipulating the food being cooked.

In this preferred embodiment, the edge 36 of cooking plate 31 is approximately 1½ to 2" longer than the side 37 of cooking tank 15 so that it substantially depends a distance corresponding to the depending skirt 23-1, 23-2 and 23-3 so as to provide a degree of protection for the cook who is inspecting and manipulating the food being cooked. Thus, the end walls of the cooking tank 15 have a length between front and back walls which is greater than the distance between the bottom wall and the front side so that when the cover 34 is hung by hook flange 34 upon the upper edge 35 of front wall 37, the cover extends below the bottom wall 24 to conveniently store the cover and at the same time provide protection to the cook from the heat and flames of the burner during inspecting and manipulation of food being cooked or during cleaning of utensils in the cooking tank when, for example, when the burners 17-1 and/or 17-2 are utilized for heating the soapy cleaning water or rinse water. A handle 33 is secured to the plate 31 for manipulative use by the cook. A pair of side flanges 51-5 provide rigidity to plate 31 and, at the same time, facilitate and locate the cover 30 over the cooking vessel 15-1 and 15-2.

It will be appreciated that in the preferred embodiment the divider 16 rises fully to the top of the cooking vessel so that the flat cover plate 31 maintains a separation between the cooking vessels so that in the event a hot cooking oil is in one of the vessels, 15-1 for example, and a hot cooking liquid such as water is in the second cooking vessel 15-2, steam and condensed water do not fall or drip down into the hot cooking oil and vice versa. Moreover, since one edge 40 of the cover is open and does not have a depending flange or rim portion, it may be positioned in a partially opened position as indicated in dotted line in FIG. 2 to allow steam and other vapors to escape, if desired, without adversely affecting the operation of the unit.

DRAIN TRAY AND DOMED DRAIN TRAY COVER

A cooked food drain tray or plate 50 having an edge 51 secured at a predetermined angle to the rear upper edge 52 of the rear wall 53 of cooking tank 15, the predetermined angle being relatively shallow so as to avoid food easily sliding into the cooking tank while on the drain tray. The drain tray is provided with cooking fluid drain guiding ribs 55L and 55R which, because of their converging angles, channel the draining cooking fluids in the direction of the arrows indicated to constrain the fluid to drain by gravity towards the centers 55C-1, 55C-2 of the respective sides 50-1 and 50-2 of drain plate 50. A pair of end rib members 50-E1 and 50-E2 angle slightly inwardly to cause cooking fluids or liquids to empty or drain directly into the respective side 15-1 and 15-2 of the cooking tank 15. Likewise, a central divider rib 50-C has a outwardly flaring ends 50-C1 and 50-C2 which constrains the cooking fluids to flow to the respective cooking tanks so that in the event one cooking tank or vessel is being used for a hot cooking oil such as used in frying chicken, potatoes or other deep frying foods (which, of course, can be lowered into the cooking vessel oil in a basket or the like if desired) and the second vessel 15-2 which may be cooking a stew, or steaming vegetables and the like so that the cooking liquid which may be water drains directly into the tank assigned thereto thereby avoiding the dropping of water for example into hot oil.

A dome shaped drain tray cover 60 having end plates 61-E1 and 61-E2 fits inside of the guide ribs 50-E1 and 50-E2, respectively. A handle 63 is secured to the center of the dome cover 60 so that it may be operated. In this preferred embodiment, an edge 65 of the dome cover 60 (it being appreciated that the term dome shaped includes rectangularly as well as curved shapes) being hingably secured to the outermost edge 66 of drain plate 50 by a piano-type hinge 67 which has a hinge pin or rod 68 about which the dome shaped cover 60 pivots.

A heat transfer and coupling flange 69 is provided on the inward end 51 of drain plate 50 and a pair of fasteners 70-1, 70-2 having smooth rounded heads secured to the flange 69 and the fasteners 70-1 and 70-2 have threaded shafts 72 which pass through the enlarged holes 73 in the upper edge of back wall 53 (see FIG. 4a) and a wing nut 74 causes a snug, tight abutment between the upper end of back plate 53 and flange 69 on drain tray 50 so that there is a good heat transfer relationship between the flange 69 and the upper end 53 of the back wall of the cooking vessel 15. This assures that the drain tray 50 is heated so as to maintain warmth or heat in the food resting on drain tray 50 and covered by the domed cover 60. The heat flow is from the back wall 53 through the flange 59 and outwardly through the drain tray 50. Instead of the flange being on the inner edge of the drain tray 50, the heat transfer and coupling flange 69' can be on the upper edge of back wall 53' and the fastener 70-1' and wing nut 74' can be fastened tightly to cause a snug contacting between the inner end 51' of drain tray 50' which assures a flow of the draining fluids or liquids back into the cooking vessel without leaking to the exterior. The rounded heads of the fasteners are broad enough to cover any opening and thus seal or prevent the leaking of draining fluids to the exterior of the cooking vessel.

Brace members 80 and 81 support the drain tray 50 in its predetermined drain position. However, the inner end of the drain tray can be unfastened or unsecured from the upper edge 53 of the cooking vessel by removing the wing nuts 74 and by unscrewing the connection of the other end of the braces 80 and 81 so as to slide the drain tray 50 and the domed cover 60 over the cooking vessel and cover 31. For this purpose, the inner end of braces 80 and 81 are provided with a plate 82 that has a rear edge 83 for engaging the rear surface of wall 53' and a projecting screw fastener 84 passes through an opening (not shown) in plate 82 and is secured in place by wing nut 85. The outer upper end 86 is pivotally connected to hinge pin 68 for the dome cover 60.

The above described preferred embodiment of the invention achieves a multi-purpose cooker which can perform various functions from frying fish or chicken as described above to barbecuing ribs, cooking chicken, steaming crabs, lobster or shrimp on racks which may be removable, and for the preparation of soups and stews. The cooker is divided to allow one to fry or steam favorite foods simultaneously and has attached drain tray to keep food warm and drain excess oils and/or other cooking liquids back into the cooker. The burners for each of the side of the cooker is adjustable so as to control the temperature of the cooking liquids. Drain plugs are located on each side of the cooker to allow the oil or other cooking liquids to be drained from the cooker into storage containers which stores the liquids until ready for use again. The cooker is also easy to clean using soap and water for cleaning or by sponge or by a garden hose. The cooker can be used for cleaning dishes and the like as described above and can be used at home or away. Moreover, the cooker has wheels for accessability onto the patio, camping trips or to take along on a boat to fry the great catch of the day. The domed cover for the drain tray helps keep the food warm and free from insects, debris, leaves and the like. Finally, this cooker can be used as a canner in which you use glass jars.

While we have described and illustrated specific embodiments of our invention, it will be clear that variations of the details of construction which are specifically illustrated and described may be resorted to without departing from the true spirit and scope of the invention as defined in the appended claims.

What we claim is:

1. In an outdoor gas cooker having a rectangular metal cooking tank for holding a cooking liquid to be heated by a gas flame from a gas burner mounted beneath said cooking tank to bottom surface of said metal cooking tank, the improvement comprising,
   a cooked food drain plate having an edge secured at a predetermined angle, to the rear, upper edge of said tank so that cooking liquid from cooked food on said cooked food drain plate drains into said metal cooking tank, said predetermined angle being relatively shallow so as to avoid food sliding into said cooking tank while on said drain tray, including brace means for said cooked food drain plate,
   a domed cover for minimizing heat loss from cooked food on said cooked food drain plate and preventing access to cooked food by insects, grass, dirt, leaves, etc. while on said cooked food drain plate, means hingably connecting said dome shaped cover to the edge of said cooked food drain plate remote from the said edge thereof which is secured to the said rear upper edge of said cooking tank, and
   a cooking tank cover, said cooking tank cover being constituted by a flat metal plate having an area complementary to the cross-sectional area of said cooking tank so as to close off the top of said cooking tank while food is being cooked therein, a handle on the upper surface of said flat metal plate, and at least one depending flange depending from one edge of said flat metal plate so that said one depending flange can serve as a hook to hang the said cooking tank cover from the front upper edge of said cooking tank while the cook is inspecting food being cooked.

2. The outdoor gas cooker defined in claim 1 including means for dividing the cooking tank into a plurality of separate cooking tanks and burner means for each tank, and separate control means for each burner.

3. The outdoor gas cooker defined in claim 1 wherein said metal cooking tank is rectangular with a front and rear side, two end plates and a bottom plate, and has divider plate means and rear plates on the interior thereof extending normal to said front means and rear plates of said tank and extending to the upper edge thereof to thereby divide said cooking tank into at least two cooking receptacles, a separate controllable gas burner means associatively mounted on said cooker under the lower surface and proximate the center of each said cooking receptacle whereby one cooking receptacle can fry foods in a hot liquid cooking oil and another of said cooking receptacles can cook food water based cooking style.

4. The outdoor gas cooker defined in claim 2 wherein said drain plate includes fluid guide means for guiding drained cooking liquids into their respective cooking tanks.

5. The outdoor cooker defined in claim 4 wherein said fluid guide means includes rib means on the upper surface of said drain plate.

6. The outdoor cooker defined in claim 5 wherein said rib means includes a divider means approximate the center of said drain plate.

7. The outdoor gas cooker defined in claim 1 including drain port means at the lower portion of said cooking tank for draining cooking liquid therefrom.

8. The outdoor gas cooker defined in claim 3 including drain port means at the lower portions of each said end plates for draining cooking liquid from each cooking tank, respectively.

9. The outdoor gas cooker defined in claim 1 wherein said metal cooking tank is substantially rectangular in cross-section and has front and rear substantially planar side walls joined to two substantially planar end walls and a substantially planar bottom wall.

10. In an outdoor gas cooker comprising a generally rectangular metal cooking tank, having front and back walls joined by a pair of end walls and a bottom wall, said cooking tank being adapted to contain a cooking liquid, means for applying a heating flame to said cooking tank comprising a controllable burner mounted beneath said bottom wall, the improvement comprising, a metal cover for said cooking tank, said metal cover being generally rectangular and planar and having front and rear sides and an area complementary to and slightly larger than the area of said rectangular metal cooking tank, and a depending flange running along said front side so that said cover can be hooked by said depending flange upon the upper edge of said front wall for storage while the cook is inspecting and manipulating food being cooked.

said end walls have a length between said front and back walls which is greater than the distance between said bottom wall and said front side so that when said cover is stored with said depending flange hooked upon said upper edge of said front wall, said cover extends below said bottom wall to provide protection to the cook from heat and flames of said heating flame during inspecting and manipulation of food being cooked.

11. The outdoor gas cooker defined in claim 10 including a drain tray having an edge secured to the upper edge of back wall for supporting cooked food and returning drained cooking food to said cooking tank, and a dome shaped cover for said drain tray, said dome shaped cover maintaining warmth in cooked food while on said drain tray and preventing insects, leaves, twigs and other debris from reaching the cooked food while it is draining.

12. The outdoor cooker defined in claim 11 including means for hingably connecting said domed cover to an edge of said drain tray.

13. In an outdoor cooker comprising a generally rectangular cooking tank for holding a cooking liquid and having front and back walls, a pair of end walls and a bottom wall, fluid fuel burner means mounted beneath said bottom wall, the improvement comprising, said rectangular metal cooking tank has divider plate means on the interior thereof extending normal to said front and rear walls of said tank and extending to the upper edge thereof to thereby divide said cooking tank into at least two cooking receptacles, said fluid fuel burner means includes a separate controllable gas burner associatively mounted on each said cooker under the lower surface and proximate the center of each said cooking receptacle, respectively, whereby one cooking receptacle can fry foods in a hot liquid cooking oil and another of said cooking receptacles can cook food water based cooking style, and a planar rectangular cooking tank cover, said cooking tank cover being constituted by a flat plate having an area complementary to the area of said rectangular cooking tank so as to close off the top of said cooking tank while two separate foods are being cooked therein, a handle on the upper surface of said flat metal plate, said divider plate cooperating with said cooking tank cover to maintain a separation between cooking fluids in said at least two cooking receptacles, drain plate means secured to the upper edge of said rear wall, a central divider rib on said drain plate means, said drain plate means being arranged to receive and drain cooking liquid from cooked foods and return the drained cooking liquid to said each said cooking receptacles, respectively.

14. The outdoor cooker defined in claim 13, including a dome shaped cover adapted to fit over said drain plate for protecting said cooked food from insects, leaves, twigs, dirt, etc. while preventing excessive cooling of said cooked food while draining.

15. The outdoor gas cooker defined in claim 14 including means for hingedly coupling an edge of said dome shaped cover to the edge of said drain plate means remote from said upper edge of said rear wall to prevent food from being thrown beyond the drain plate by the cook.

16. The outdoor gas cooker defined in claim 13, wherein said drain plate includes fluid guide means for guiding drained cooking liquids into their respective cooking tanks.

* * * * *